April 12, 1927.

F. W. KUHNAST 1,624,745

COMBINED COVER AND STRAINER

Filed July 28, 1926

WITNESSES

INVENTOR
FREDRICK W. KUHNAST
BY
ATTORNEYS

Patented Apr. 12, 1927.

1,624,745

UNITED STATES PATENT OFFICE.

FREDRICK W. KUHNAST, OF NEW YORK, N. Y.

COMBINED COVER AND STRAINER.

Application filed July 28, 1926. Serial No. 125,487.

This invention relates to cooking utensils and has particular reference to a combined cooking utensil cover and strainer.

The outstanding object of the present invention is to provide a combined cooking utensil cover and strainer which is so constructed as to render the same readily adaptable to utensils of various sizes so that the same may be selectively used in connection with a number of utensils.

The invention furthermore comprehends a combined utensil cover and drain which is provided with means for readily associating the same with or disassociating the same from a utensil.

The invention aims as a still further object to provide a combined utensil cover and strainer which is simple in construction, economical to produce, and which is highly efficient in its purpose.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1:
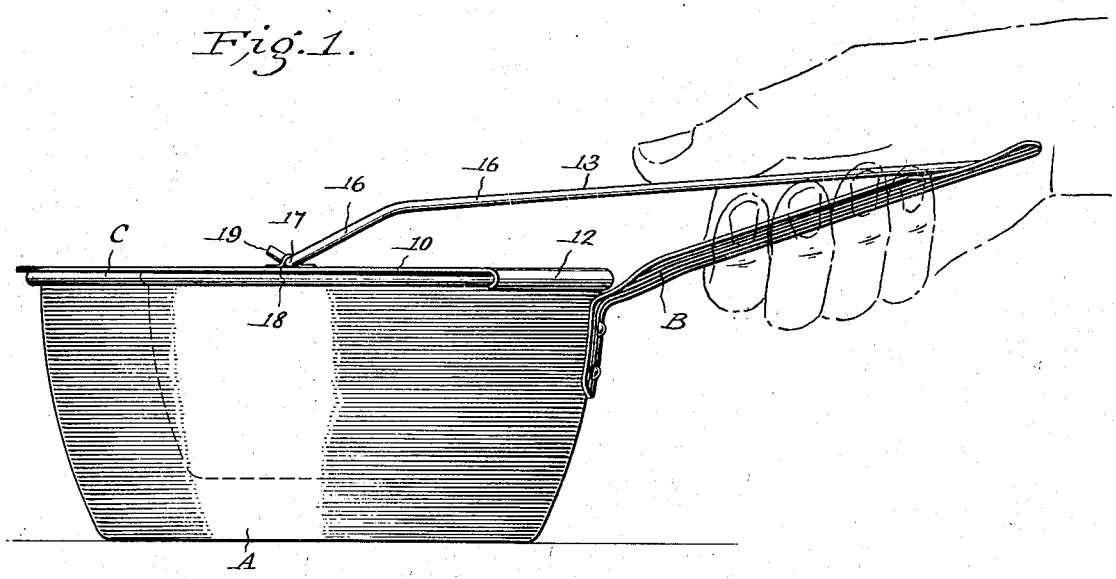
Figure 1 is a side view illustrating the cover applied to a utensil.
Figure 2:
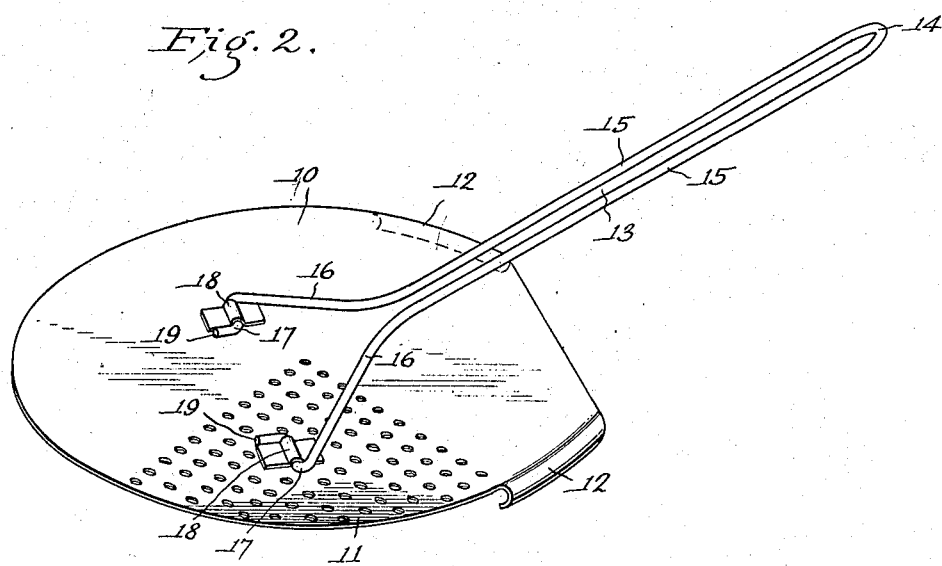
Fig. 2 is a perspective view of the cover and strainer removed.

Referring to the drawings by characters of reference, A designates a cooking utensil having a handle B provided with a peripheral bead C at the open upper end of the body.

The combined cover and strainer constituting the present invention, consists of a substantially circular body or disk 10, having a segmental foraminous or perforated portion 11 and provided with a pair of circumferentially spaced hooked bead-engaging lugs 12. The handle 13, preferably constructed from a single length of resilient wire, is bent medially upon itself at 14, to provide parallel leads 15, the free ends 16 of which are bent downwardly and laterally. The terminals 17 of the ends 16 are thence bent inwardly and extend through bearings 18 on the upper surface of the body 10, the said terminals 17 being maintained in the bearings by means of right-angularly bent extremities 19, which also function to limit the upward swinging movement of the handle with respect to the body 10. Preferably the bearings are disposed at one side of the axial center so that when the cover is lifted by the handle, the upper surface engages with the extremities 19. Under this construction and arrangement when the combined cover and strainer is associated with the cooking utensil, the under surface rests on the top of the utensil with the hooked bead-engaging lugs engaging under the bead and with the bight 14 of the handle resting on the utensil handle B, as illustrated. This position will be assumed irrespective of the size of the utensil or vessel with which the device is associated, as it is obvious that in the smaller sizes of utensils illustrated by the broken lines in Fig. 1, a portion of the body 10 will protrude beyond the vessel after the lugs 12 are engaged with its bead.

When it is desired to drain liquids from the vessel through the foraminous or perforated portion 11, the user grasps the handle B of the utensil and by pressing down with the thumb on the handle 13 of the combined cover and strainer, maintains the cover in correlated position during the inverting and draining operation.

What is claimed is:

1. A draining device for utensils having a bead at the upper end of the body and an outwardly projecting handle, said device comprising a disk-like body formed with perforations, a bead-engaging hook on said body, and a handle pivoted to the upper side and at approximately the center of said body for limited swinging movement so as to project from the side provided with the bead-engaging hook, the said body adapted to overlie the upper end of the utensil with the hook engaging the bead of the handle side of the utensil and with the handle of the device resting upon the utensil handle to be grasped together therewith for retaining the hook in engagement with the bead of the utensil and impinging the body of the device in flat frictional contact with the upper end of the utensil.

2. A device for facilitating the draining of liquids from a utensil of the type having a bead at its upper end and an outwardly projecting handle, said device including a disk-like perforated body formed with a peripheral depending bead-engaging hook and a handle pivoted to the upper surface and adjacent the center of said disk-like body with means for limiting the pivotal movement of the handle away from the body and insuring the projection of the handle from the edge of the disk-like body which is provided with the bead-engaging hook.

3. A draining device for utensils of the character set forth, said device including a flat perforated body having a marginal depending bead-engaging hook at one side and a handle pivoted to the upper surface and adjacent the center of said body for limited swinging movement whereby to insure the projection of the handle from the side provided with the bead-engaging hook.

4. A combined utensil cover and strainer, including a body member adapted to overlie the open upper end of the utensil, said body having a strainer portion, means engageable with the bead of the utensil, and a handle pivoted thereto adjacent the center of the upper side thereof adapted to rest upon the utensil handle and to be grasped by the hand with the utensil handle to frictionally maintain the cover in place when inverting and draining the utensil, the cover handle being pivotally connected with the cover body for limited swinging movement and consisting of a length of resilient material bent medially to provide parallel arms connected by a bight at one end and formed with down-turned laterally bent opposite ends having inwardly bent terminals journaled in bearings on the cover body.

5. A combined utensil cover and strainer, including a body member adapted to overlie the open upper end of the utensil, said body having a strainer portion, means engageable with the bead of the utensil, and a handle pivoted thereto adapted to rest upon the utensil handle and to be grasped by the hand with the utensil handle to maintain the cover in place when inverting and draining the utensil, the cover handle being pivotally connected with the cover body for limited swinging movement and consisting of a length of resilient material bent medially to provide parallel arms connected by a bight at one end and formed with downturned laterally bent opposite ends having inwardly bent terminals journaled in bearing on the cover body, the said terminals having angularly bent extremities constituting means for maintaining the terminals in the bearings and for limiting the swinging movement of the handle.

6. A device for facilitating the draining of liquid from a utensil having a rigid handle projecting outwardly therefrom, said device including a body having drain apertures, depending means on said body engageable with the side wall of the upper end, and a handle pivoted to the upper side of the body at a point which is disposed within the area of the utensil to which the device is applied and of such a length that its outer end will rest on the handle of the utensil, whereby the handle of the device is adapted to rest upon the handle of the utensil to be grasped together with the utensil handle for forcing and maintaining the depending means in frictional contact with the side wall of the upper end of the body and with the body in flat frictional contact with the upper end of the utensil.

7. A device for facilitating the draining of liquids from a utensil of the type which has an open upper end and is provided with a rigid handle projecting outwardly from said upper end, said device including a body having drain apertures and a depending portion engageable with the side wall of the upper end, and a handle connected to the upper surface of the body in such a manner as to permit of limited relative movement of the handle with respect to the body, the connection of the handle with the body being at a point which is disposed within the area of the utensil to which the device is applied and the handle being of such a length that its outer end will rest on the handle of the utensil, whereby the handle of the device is adapted to rest upon the handle of the utensil, to be grasped together with the utensil handle for forcing and maintaining the depending portion of the body in frictional contact with the side wall of the upper end of the utensil and with the body of the device in frictional contact with the upper open end of the utensil.

FREDRICK W. KUHNAST.